US008239690B2

(12) United States Patent
Funahashi

(10) Patent No.: US 8,239,690 B2
(45) Date of Patent: Aug. 7, 2012

(54) STORAGE DEVICE AND STORAGE METHOD, AND INFORMATION-PROCESSING DEVICE AND INFORMATION-PROCESSING METHOD

(75) Inventor: Takeshi Funahashi, Saitama (JP)

(73) Assignee: Sony Corporation, Tokyo (JP)

( * ) Notice: Subject to any disclaimer, the term of this patent is extended or adjusted under 35 U.S.C. 154(b) by 1021 days.

(21) Appl. No.: 11/825,585

(22) Filed: Jul. 6, 2007

(65) Prior Publication Data

US 2008/0034223 A1 Feb. 7, 2008

(30) Foreign Application Priority Data

Aug. 2, 2006 (JP) ................ P2006-210977

(51) Int. Cl.
*G06F 21/00* (2006.01)
(52) U.S. Cl. .......................... 713/193; 726/28
(58) Field of Classification Search .......... 713/193; 726/28
See application file for complete search history.

(56) References Cited

U.S. PATENT DOCUMENTS

| 6,782,477 | B2 * | 8/2004 | McCarroll ............... 713/189 |
| 6,950,939 | B2 * | 9/2005 | Tobin .................... 713/182 |
| 7,159,120 | B2 * | 1/2007 | Muratov et al. .......... 713/182 |
| 7,255,270 | B2 * | 8/2007 | Kwon et al. ............. 235/382 |
| 7,379,549 | B2 * | 5/2008 | Pelly et al. ............. 380/278 |
| 7,395,435 | B2 * | 7/2008 | Benhammou et al. ...... 713/185 |
| 7,437,752 | B2 * | 10/2008 | Heard et al. ............ 726/1 |
| 7,461,406 | B2 * | 12/2008 | Pelly et al. ............ 726/27 |
| 7,464,406 | B2 * | 12/2008 | Cromer et al. .......... 726/21 |
| 7,478,248 | B2 * | 1/2009 | Ziv et al. .............. 713/193 |
| 7,512,805 | B2 * | 3/2009 | Nunnelley .............. 713/184 |
| 7,519,203 | B2 * | 4/2009 | Chiu et al. ............. 382/124 |
| 7,685,375 | B2 * | 3/2010 | Narayanaswami et al. ... 711/152 |
| 2002/0114461 | A1 * | 8/2002 | Shimada et al. ......... 380/201 |
| 2002/0188856 | A1 * | 12/2002 | Worby ................... 713/193 |
| 2004/0123127 | A1 * | 6/2004 | Teicher et al. .......... 713/193 |
| 2004/0139255 | A1 * | 7/2004 | Cheng .................... 710/74 |
| 2005/0081048 | A1 | 4/2005 | Komarla et al. |
| 2006/0262928 | A1 * | 11/2006 | Bar-El et al. ........... 380/228 |
| 2007/0155487 | A1 | 7/2007 | Nakano et al. |
| 2008/0059660 | A1 * | 3/2008 | Cheng .................... 710/14 |
| 2008/0101766 | A1 | 5/2008 | Shimizu et al. |

FOREIGN PATENT DOCUMENTS

| JP | 09-237228 | 9/1997 |
| JP | 2001-035092 | 2/2001 |
| JP | 2005-275112 | 10/2005 |
| JP | 2005-275810 | 10/2005 |
| JP | 2006-099701 | 4/2006 |
| JP | 2006-109307 | 4/2006 |
| JP | 2006-146744 | 6/2006 |
| JP | 2006-155481 | 6/2006 |

* cited by examiner

*Primary Examiner* — Edan Orgad
*Assistant Examiner* — James Turchen
(74) *Attorney, Agent, or Firm* — Robert J. Depke; Rockey, Depke & Lyons, LLC

(57) ABSTRACT

A storage device that can be attached and/or detached to and/or from an information-processing device is provided. The storage device includes a storage unit including a first area provided to store an encryption key used to encode first information and first authentication information used to perform authentication, and a second area storing second information encoded by the information-processing device by using the encryption key, an authentication unit configured to authenticate a user based on second authentication information generated by the information-processing device based on third information input by the user and the first authentication information, a transmission unit configured to transmit the encryption key to the information-processing device when validity of the user is confirmed through the authentication, and a control unit configured to have control over writing and/or reading the encoded second information into and/or from the second area.

9 Claims, 12 Drawing Sheets

STORAGE DEVICE AND STORAGE METHOD, AND INFORMATION-PROCESSING DEVICE AND INFORMATION-PROCESSING METHOD

CROSS REFERENCES TO RELATED APPLICATIONS

The present invention contains subject matter related to Japanese Patent Application JP 2006-210977 filed in the Japanese Patent Office on Aug. 2, 2006, the entire contents of which are incorporated herein by reference.

BACKGROUND OF THE INVENTION

1. Field of the Invention

The present invention relates to a storage device and a storage method, and an information-processing device and a information-processing method, and particularly relates to a storage device and a storage method, and an information-processing device and an information-processing method that are provided to prevent leakage of information stored in the storage device including a universal-serial-bus (USB) storage media or the like, for example.

2. Description of the Related Art

Known USB-storage media functioning, as a removable memory including a USB interface, are inexpensive and easy to use. Therefore, the USB-storage media have become widely available with speed.

Incidentally, Japanese Unexamined Patent Application Publication No. 2001-35092 discloses a removable memory including a management area, a data area, and a security area. The management area can store management data and it is difficult for a user to rewrite the management area. As for the data area, the user can store and/or reproduce data in and/or from the data area. The security area can store security data that is set and managed by firmware of a removable-memory drive of the removable memory, so as to control access to the removable memory.

SUMMARY OF THE INVENTION

Since the known USB-storage media are generated without consideration for security, there is a high possibility that information stored in the USB-storage media leaks out.

For example, when the method disclosed in Japanese Unexamined Patent Application Publication No. 2001-35092 is used for the USB-storage media, information stored in the USB-storage media is not encoded, which means that the information stored in the USB-storage media may leak out.

According to an embodiment of the present invention, leakage of information stored in a storage device such as the USB-storage media is reduced.

According to an embodiment of the present invention, there is provided a storage device that can be attached and/or detached to and/or from an information-processing device. The storage device includes a storage unit including a first area provided to store an encryption key used to encode first information and first authentication information used to perform authentication, and a second area provided to store second information encoded by the information-processing device by using the encryption key, an authentication unit configured to authenticate a user based on second authentication information generated by the information-processing device based on third information input by the user and the first authentication information stored in the first area, a transmission unit configured to transmit the encryption key stored in the first area to the information-processing device when validity of the user is confirmed through the authentication, and a control unit configured to have control over writing and/or reading the encoded second information into and/or from the second area.

According to another embodiment of the present invention, there is provided a storage method used for a storage device that can be attached and/or detached to and/or from an information-processing device, where the storage device has a storage unit including a first area provided to store an encryption key used to encode first information and first authentication information used to perform authentication, and a second area provided to store second information encoded by the information-processing device by using the encryption key. The storage method includes the steps of authenticating a user based on second authentication information generated by the information-processing device based on third information input by the user and the first authentication information stored in the first area, transmitting the encryption key stored in the first area to the information-processing device when validity of the user is confirmed through the user authentication, and having control over writing and/or reading the encoded second information into and/or from the second area.

According to another embodiment of the present invention, there is provided an information-processing device to which a detachable storage device is attached. The information-processing device includes an authentication-information-generation unit configured to generate first authentication information used to perform authentication based on first information input by a user, and an encode-processing unit configured to encode second information stored in the storage device and/or decode the encoded second information transmitted from the storage device by using an encryption key used to perform information encoding, the encryption key being transmitted from the storage device, when validity of the user is confirmed during the authentication performed by the storage device for the user based on the first authentication information and second authentication information stored in the storage device.

According to another embodiment of the present invention, there is provided an information-processing method used for an information-processing device to which a detachable storage device is attached. The information-processing method includes the steps of generating first authentication information used to perform authentication based on first information input by a user, and encoding second information stored in the storage device and/or decoding the encoded second information transmitted from the storage device by using an encryption key used to perform information encoding, the encryption key being transmitted from the storage device, when validity of the user is confirmed during the authentication performed by the storage device for the user based on the first authentication information and second authentication information stored in the storage device.

According to an embodiment of the present invention, a storage unit includes a first area provided to store an encryption key used to encode first information and first authentication information used to perform authentication, and a second area provided to store second information encoded by the information-processing device by using the encryption key. Then, authentication of a user is performed based on second authentication information generated by the information-processing device based on third information input by the user and the first authentication information stored in the first area. When validity of the user is confirmed through the user authentication, the encryption key stored in the first area is transmitted to the information-processing device, and writing and/or reading the encoded second information into and/or from the second area is controlled.

According to another embodiment of the present invention, first authentication information used to perform authentication is generated based on first information input by a user. When validity of the user is confirmed during the authentication performed by the storage device for the user based on the first authentication information and second authentication information stored in the storage device, second information stored in the storage device is encoded and/or the encoded second information transmitted from the storage device is decoded by using an encryption key used to perform information encoding, the encryption key being transmitted from the storage device.

According to the above-described embodiments, the information leakage can be reduced.

DESCRIPTION OF THE PREFERRED EMBODIMENTS

Before describing embodiments of the present invention, the correspondence between the features of the claims and the specific elements disclosed in an embodiment of the present invention is discussed below. This description is intended to assure that specific elements disclosed in an embodiment supporting the claimed invention are described in this specification and/or drawings. Thus, even if an element in an embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features, of the claims.

Figure 1:
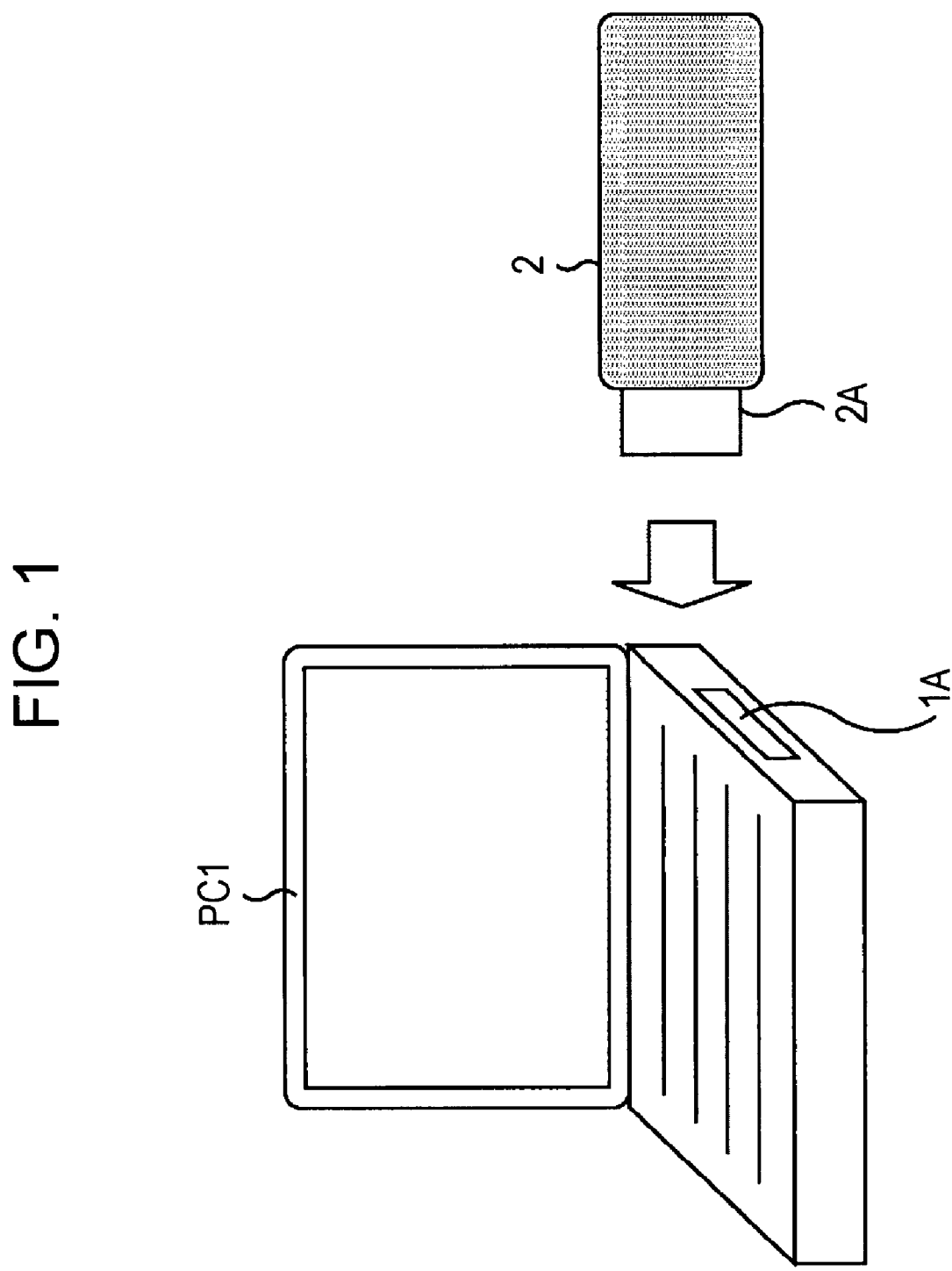
FIG. 1 schematically shows a PC and a USB-storage media according to an embodiment of the present invention.

A storage device according to an embodiment of the present invention is provided, as a storage device that can be attached and/or detached to and/or from an information-processing device including a personal computer (PC) 1 shown in FIG. 1, for example. The storage device includes universal-serial-bus (USB)-storage media 2 shown in FIG. 1, for example. The USB-storage media 2 include a storage unit such as a flash memory 62 shown in FIG. 4. The storage unit includes a first area such as a special area 81 shown in FIG. 4, the first area being provided to store an encryption key provided to encrypt information and authentication information used for performing authentication, and a second area such as a secure area 82 shown in FIG. 4, the second area being provided to store information encoded by the information-processing device by using the above-described encryption key. The storage device such as the USB-storage media 2 further includes an authentication unit provided to authenticate a user based on authentication information generated by the information-processing device based on information input by the user, and the authentication information stored in the first area. The above-described authentication unit is provided, as a central-processing unit (CPU) 72 shown in FIG. 4, the CPU 72 performing the processing corresponding to step S102 shown in FIG. 11 and/or step S132 shown in FIG. 12, for example. The storage device such as the USB-storage media 2 further includes a transmission unit configured to transmit the encryption key stored in the first area to the information-processing device when the validity of the user is confirmed through the authentication performed by the authentication unit. The transmission unit is provided, as the CPU 72 performing the processing corresponding to step S104 shown in FIG. 11 and/or step S134 shown in FIG. 12. The storage device such as the USB-storage media 2 further includes a control unit controlling writing and/or reading information encoded by the information-processing device by using the encryption key in and/or from the second area. The control unit is provided, as a flash-memory controller 75 shown in FIG. 4, for example.

A storage method according to another embodiment of the present invention is used for a storage device that can be attached and/or detached to and/or from an information-processing device. The above-described storage device includes a storage unit having a first area provided to store an encryption key provided to encode information and authentication information used for performing authentication, and a second area provided to store information encoded by the information-processing device by using the above-described encryption key. The storage method includes the step of authenticating a user based on authentication information generated by the information-processing device based on information input by the user, and the authentication information stored in the first area. The above-described authentication corresponds to the processing performed at step S102 shown in FIG. 1 and/or step S132 shown in FIG. 12. The storage method further includes the step of transmitting the encryption key stored in the first area to the information-processing device when the validity of the user is confirmed through the user authentication. The above-described transmission corresponds to the processing performed at step S104 shown in FIG. 11 and/or step S134 shown in FIG. 12. The storage method further includes the step of controlling writing and/or reading information encoded by the information-processing device by using the encryption key in and/or from the second area. The above-described control corresponds to the processing performed at step S106 shown in FIG. 11 and/or step S135 shown in FIG. 12.

A detachable storage device is attached to an information-processing device according to another embodiment of the present invention. The above-described information-processing device includes an authentication-information-generation unit generating authentication information used to perform authentication based on information input by a user. The authentication-information-generation unit may be a hash-value-calculation unit 42 shown in FIG. 3, for example. The above-described information-processing device further includes an encode-processing unit provided to encode information stored in the storage device and/or decode the encoded information transmitted from the storage device by using an encryption key used for encoding information, the encryption key being transmitted from the storage device, when the validity of the user is determined through authentication of the user, the user authentication being performed by the storage device, based on the authentication information generated based on the information input by the user and authentication information stored in the storage device. The encode unit may be an encode-processing unit 44 shown in FIG. 3, for example.

According to another embodiment of the present invention, there is provided an information-processing method used for an information-processing device to which a detachable storage device is attached. The above-described information-processing method includes the step of generating authentication information used to perform authentication based on information input by a user. The authentication-information-generation step corresponds to step S92 shown in FIG. 11 and/or step S122 shown in FIG. 12. The above-described information-processing method further includes the step of encoding information stored in the storage device and/or decoding the encoded information transmitted from the storage device by using an encryption key used for encoding information, the encryption key being transmitted from the storage device, when the validity of the user is determined through the user authentication performed by the storage device, based on the authentication information generated based on the information input by the user and authentication information stored in the storage device. The step of encoding the information stored in the storage device and/or decoding the encoded information transmitted from the storage device corresponds to step S95 shown in FIG. 11 and/or step S126 shown in FIG. 12, for example.

Hereinafter, embodiments of the present invention will be described with reference to the attached drawings.

FIG. 1 schematically shows the PC 1 and the USB-storage media 2 according to an embodiment of the present invention.

In FIG. 1, the USB-storage media 2 can be attached and/or detached to and/or from the PC 1.

That is to say, the PC 1 includes a USB connector 1A and the USB-storage media 2 include a USB connector 2A. When the USB connector 2A is inserted into the USB-connector 1A, the USB-storage media 2 is attached to the PC 1.

After the USB-storage media 2 are attached to the PC 1, the PC 1 encourages the user to input a password. After the user inputs the password, the PC 1 accepts the input password. Further, the PC 1 generates a hash value of the input password (hereinafter referred to as a password hash, as required), and transmits the password hash to the USB-storage media 2.

The USB-storage media 2 stores the password hash that had already been registered, and authenticates the user based on the password hash transmitted from the PC 1 and an internal-password hash, which is a password hash of the insides of the USB-storage media. After the validity of the user is confirmed, the USB-storage media 2 transmits an encryption key that had already been stored therein to the PC 1.

The PC 1 receives the encryption key transmitted from the USB-storage media 2 and encodes data by using the transmitted encryption key. Then, the PC 1 transmits the encoded data to the USB-storage media 2 so that the USB-storage media 2 stores the encoded data. Further, the PC1 reads the encoded data from the USB-storage media 2 and decodes the encoded data by using the encryption key transmitted from the USB-storage media 2.

Figure 2:
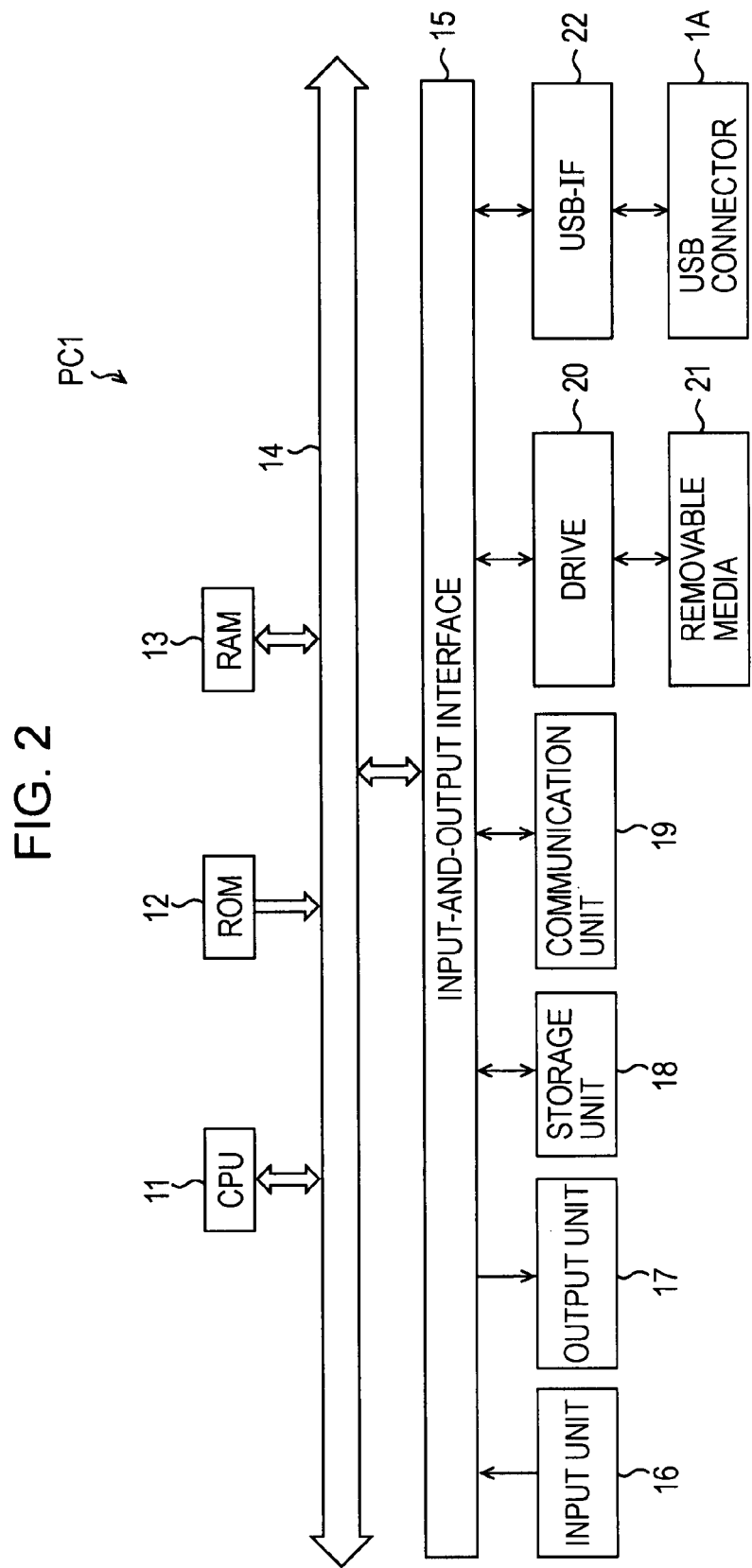
FIG. 2 is a block diagram showing an example internal configuration of the PC.

FIG. 2 is a block diagram showing an example configuration of the PC 1.

In FIG. 2, the PC 1 includes the USB connector 1A, a CPU 11, a read-only memory (ROM) 12, a random-access memory (RAM) 13, a bus 14, an input-and-output interface 15, an input unit 16, an output unit 17, a storage unit 18, a communication unit 19, a drive 20, a removable-memory 21, and a USB-interface (I/F) 22.

The CPU 11 performs various types of processing according to a program stored in the ROM 12 and/or the storage unit 18. Further, the CPU 11 performs various types of processing according to instructions input from the input unit 16 and outputs information about a result of the processing to the output unit 17 or the like.

The RAM 13 stores at least one program executed by the CPU 11, necessary data, and so forth, as required.

The bus 14 connects the CPU 11, the ROM 12, the RAM 13, and the input-and-output interface 15 to one another.

The input-and-output interface 15 functions, as an interface connecting the input unit 16, the output unit 17, the storage unit 18, the communication unit 19, the drive 20, and the USB-IF 22 to the bus 14.

The input unit 16 includes a keyboard, a mouse, a microphone, and so forth. The output unit 17 includes a display, a speaker, and so forth. The storage unit 18 includes a hard disk or the like, so as to store the program executed by the CPU 11 and/or various types of data.

Here, in FIG. 2, at least an operating system (OS) including "WINDOWS (Registered Trademark)" or the like, and a specifically-designed application program configured to run on the above-described OS and output a specifically-designed command to the USB-storage media 2 are installed onto the storage unit 18, for example. The above-described specifically-designed application program is executed at the time when the OS is started and stays resident.

The communication unit 19 communicates with an external device and/or apparatus via a network including the Internet, a local-area network (LAN), and so forth.

When the removable memory 21 including a magnetic disk, an optical disk, a magneto-optical (MO) disk, a semiconductor memory, and so forth is inserted into the drive 20, the drive 20 drives the removable memory 21, and acquires or reads a program, data, and so forth stored in the removable memory 21. The drive 20 transfers the program and/or the data acquired from the removable memory 21 to the storage unit 18, as required, so that the storage unit 18 stores the acquired program and/or data.

The USB IF 22 functions, as an I/F provided to perform USB communications, so as to transmit and/or receive data, a command, and so froth between the USB IF 22 and the USB-storage media 2 inserted into the USB connector 1A, for example.

The program executed by the PC 1 may be stored in the ROM 12 and/or the storage unit 18 functioning, as a storage medium provided in the PC 1, in advance.

The program may be stored in the USB-storage media 2 temporarily and/or permanently and installed into the PC 1. Otherwise, the program may be stored in the removable media 21 including the flexible disk, a compact disk (CD)-ROM, the MO disk, a digital-versatile disk (DVD), the magnetic disk, the semiconductor memory, and so forth temporarility and/or permanently and installed in the PC 1.

The program executed by the PC 1 may be installed from the USB-storage media 2 and/or the removable media 21 into the PC 1. Further, the program executed by the PC 1 may be transferred to the PC 1 wirelessly via an artificial satellite provided to perform digital-satellite broadcasting. Otherwise, the program executed by the PC 1 may be transferred to the PC 1 by wire via a network including a local-area network (LAN), the Internet, and so forth. In the PC 1, the program transferred in the above-described manner can be received by the communication unit 19 and installed into the storage unit 18 provided in the PC 1.

Figure 3:
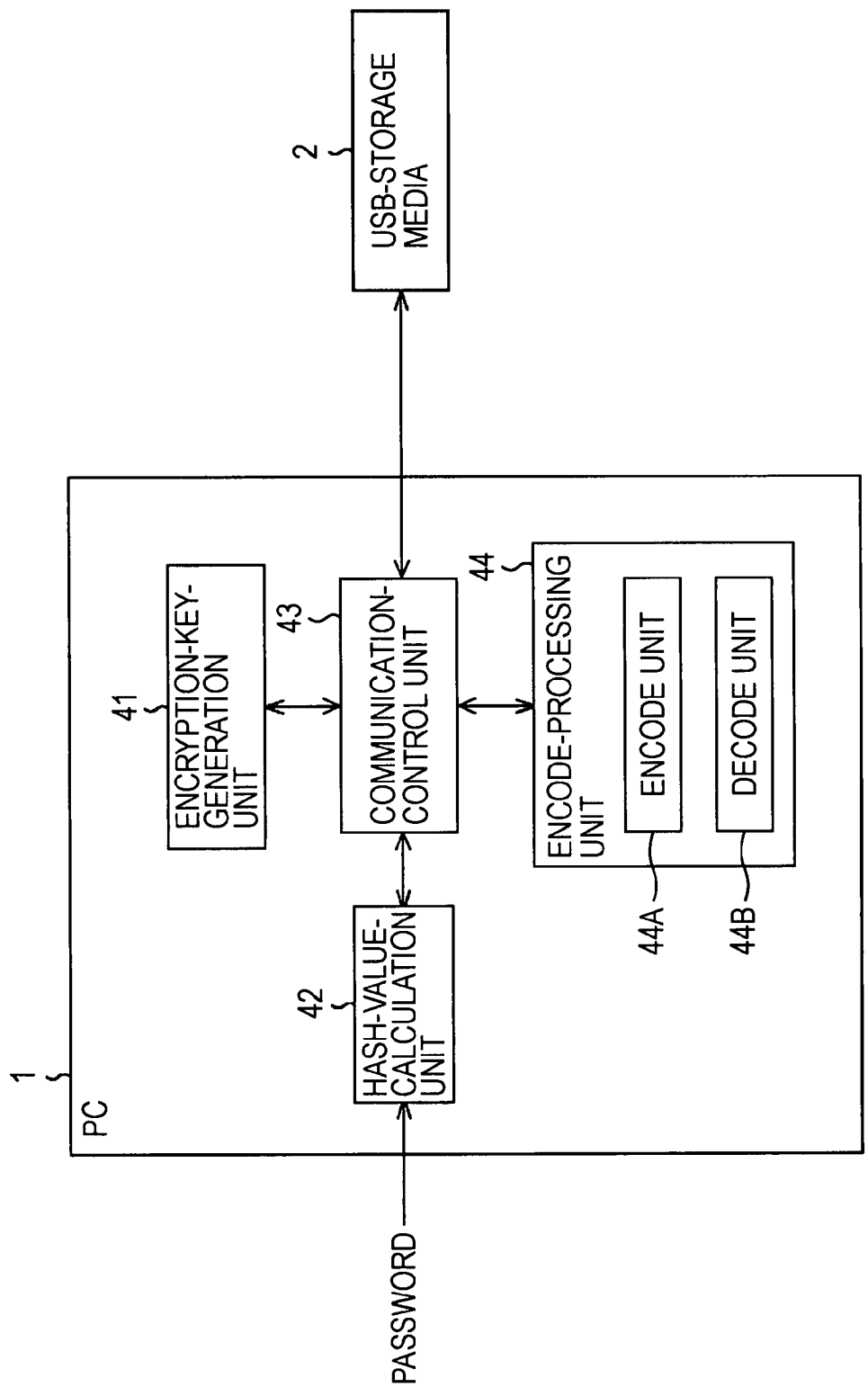
FIG. 3 is a block diagram showing an example functional configuration of the PC.

FIG. 3 is a block diagram showing an example functional configuration of the PC 1 shown in FIG. 1.

In FIG. 3, the PC 1 includes an encryption-key-generation unit 41, a hash-value-calculation unit 42, a communication-control unit 43, and an encode-processing unit 44. When the CPU 11 shown in FIG. 2 executes an OS, and executes a specifically-designed application program on the above-described OS, each of the encryption-key-generation unit 41, the hash-value-calculation unit 42, the communication-control unit 43, and the encode-processing unit 44 performs its own function.

The encryption-key-generation unit 41 generates a random number, generates the encryption key based on the random number, and transmits the encryption key to the communication-control unit 43.

A password input by the user by operating the input unit 16 is transmitted to the hash-value-calculation unit 42.

The hash-value-calculation unit 42 calculates a password hash which is the hash value of the password input by the user, and transmits the password hash to the communication-control unit 43.

The communication-control unit 43 transmits the encryption key transmitted from the encryption-key-generation unit 41, the password hash transmitted from the hash-value-calculation unit 42, encoded data transmitted from the encode-processing unit 44, and so forth to the USB-storage media 2. Further, the communication-control unit 43 receives the encoded data, the encryption key, and so forth transmitted from the USB-storage media 2, and transmits the encoded data, the encryption key, and so forth to the encode-processing unit 44.

The encode-processing unit 44 includes the encode unit 44A and a decode unit 44B, so as to encode and decode data.

That is to say, the encode unit 44A encodes data or the like stored in the RAM 13 and/or the storage unit 18 by using the encryption key transmitted from the communication-control unit 43, and transmits the encoded data obtained through the above-described encoding to the communication-control unit 43.

Similarly, the decode unit 44B decodes the encoded data transmitted from the communication-control unit 43 by using the encryption key transmitted from the communication-control unit 43.

Figure 4:
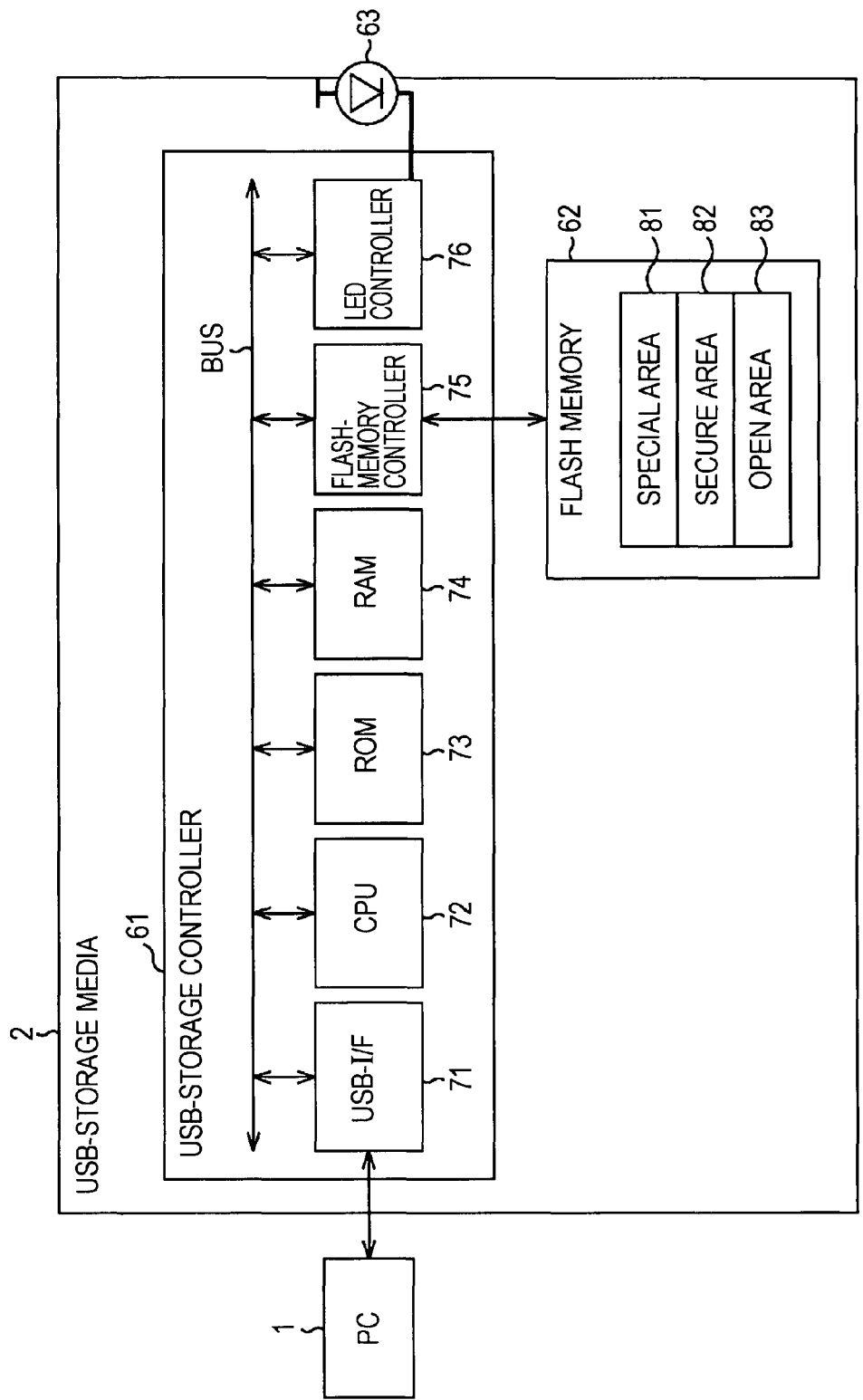
FIG. 4 is a block diagram showing an example internal configuration of the USB-storage media.

FIG. 4 is a block diagram showing an example internal configuration of the USB-storage media 2 shown in FIG. 1.

In FIG. 4, the USB-storage media 2 includes a USB-storage controller 61, a flash memory 62, and a light-emitting diode (LED) 63.

The USB-storage controller 61 controls writing and/or reading data into and/or from the flash memory 62 under the control of the PC 1. Namely, the USB-storage controller 61 writes data transmitted from the PC 1 in a predetermined area of the flash memory 62, reads the data stored in the predetermined area of the flash memory 62, and transmits the read data to the PC 1 under the control of the PC 1.

Namely, the USB-storage controller 61 includes a USB-I/F 71, the CPU 72, a ROM 73, a RAM 74, a flash-memory controller 75, and an LED controller 76 that are connected to a bus.

In the USB-storage controller 61, the USB-I/F 71 functions, as the I/F provided to perform the USB communications, as is the case with the USB-I/F 22 shown in FIG. 2. Namely, the USB-I/F 71 is connected to the PC 1 when the USB-storage media 2 is attached to the PC 1, receives data transmitted from the PC 1, outputs the transmitted data to the bus provided in the USB-storage controller 61, and transmits the data output onto the bus provided in the USB-storage controller 61 to the PC 1.

The CPU 72 controls each of the units of the USB-storage controller 61 by executing a program stored in the ROM 73 and/or the flash memory 62.

Further, the CPU 72 authenticates the user based on a password hash transmitted from the PC 1 via the USB-I/F 71.

Further, when the user authentication is achieved and the user validity is confirmed, the CPU 72 acquires the encryption key stored in a special area 81 provided in the flash memory 62 via the flash-memory controller 75, and transmits the acquired encryption key to the PC 1 via the USB-I/F 71, for example. The special area 81 will be described later.

The ROM 73 stores various types of programs executed by the CPU 72.

The RAM 74 is a working memory of the CPU 72. The RAM 74 temporarily stores data which is output during processing performed by the CPU 72 and transmits the temporarily stored data to the CPU 72.

The flash-memory controller 75 controls writing and/or reading data into and/or from the flash memory 62 under the control of the CPU 72.

Namely, the flash-memory controller 75 transmits the data output onto the bus to the flash memory 62 so that the data is stored in the flash memory 62. Further, the flash-memory controller 75 reads the data stored in the flash memory 62 and outputs the read data onto the bus.

When the PC 1 or the like accesses the USB-storage media 2, the LED controller 76 controls the LED 63 so that the LED 63 blinks, for example.

The flash memory 62 is provided, as a nonvolatile memory configured to write and/or read data transmitted from the flash-memory controller 75 of the USB-storage controller 61 under the control of the flash-memory controller 75.

Here, the flash memory 62 is divided into three areas including the special area 81, a secure area 82, and an open area 83.

The special area 81 stores an encryption key used for encoding data and a password hash or an internal-password hash used, as authentication information used for performing authentication.

The secure area 82 stores data encoded by the PC 1 by using the encryption key stored in the special area 81.

The open area 83 stores data other than data encoded by using the encryption key and the internal-password hash that are stored in the special area 81, and data encoded by using the encryption key stored in the special area 81.

The cathode of the LED 63 is connected to the LED controller 76 of the USB-storage controller 61 and the anode of the LED 63 is connected to the plus terminal of a power supply. Further, the LED 63 blinks, for example, under the control of the LED controller 76.

Next, the above-described special area 81, secure area 82, and open area 83 of the flash memory 62 shown in FIG. 4 will be described in detail with reference to FIG. 5.

Figure 5:
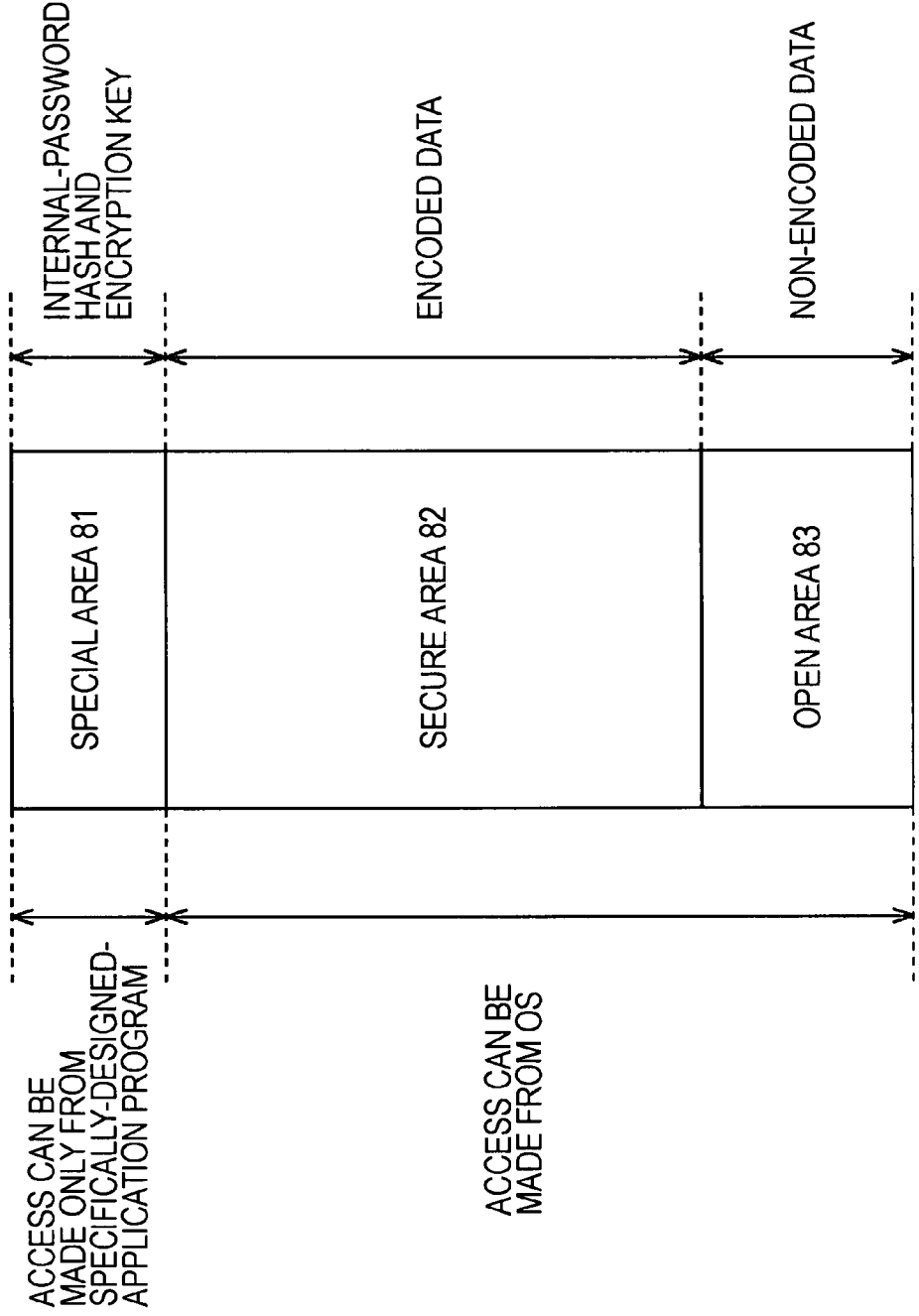
FIG. 5 shows a special area, a secure area, and an open area that are provided in a storage area of a flash memory.

FIG. 5 shows the above-described special area 81, secure area 82, and open area 83 included in a storage area of the flash memory 62.

The special area 81 is a storage area to which access can be obtained only at a specifically-designed command generated by a specifically-designed application program running on the OS of the PC 1. The above-described term "access" denotes writing and/or reading data. As described above, the special area 81 stores the encryption key and the internal-password hash.

Here, the above-described specifically-designed command may be a vender unique command generated under the small-computer-system-interface (SCSI) protocol.

The secure area 82 stores the data encoded by the PC 1 by using the encryption key stored in the special area 81 in the MS-DOS (R) format or the like so that access from the OS of the PC 1 to the encoded data can be obtained.

Here, unlike the case where the special area 81 is used, access from the OS to the secure area 82 can be obtained. Namely, data can be written and/or read in and/or from the secure area 82 at a command issued by the OS. The PC 1 where the specifically-designed application program is executed can read the encryption key from the special area 81 and decode the encoded data read from the secure area 82 by using the read encryption key. On the other hand, when the specifically-designed-application program is not executed in the PC 1, it is difficult for the PC 1 to access the special area 81. Therefore, it is difficult for the PC 1 to read the encryption key and decode the encoded data. Therefore, the encoded data is stored in the secure area 82 so that a PC other than the PC 1 where the specifically-designed application program is executed accesses the secure area 82 with difficulty.

Data which is not encoded by using the encryption key stored in the special area 81 is stored in the open area 83 in the MS-DOS (R) format or the like so that the OS can access the open area 83.

Here, the OS can access the open area 83, as is the case with the secure area 82. Further, since the data which is not encoded by using the encryption key stored in the special area 81 is stored in the open area 83, it becomes possible to access the open area 83 freely without using the specifically-designed application program, which is different from the case where the secure area 82 is used.

Figure 6:
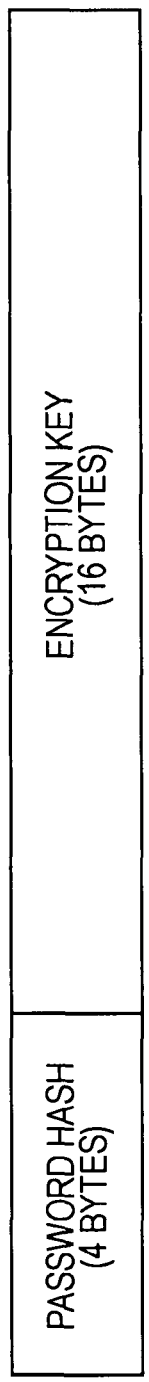
FIG. 6 shows an example internal-password hash and an example encryption key that are stored in the special area.

FIG. 6 shows an example of each of the above-described internal-password hash and encryption key that are stored in the special area 81.

4-byte data is stored in the special area 81, for example, as the internal-password hash. Further, 16-byte data is stored in the special area 81, as the encryption key.

Figure 7:
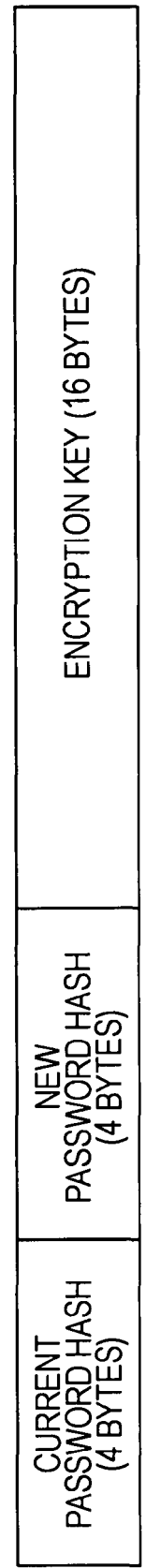
FIG. 7 shows the format of control data transmitted from the PC to the USB-storage media.

FIG. 7 shows the format of control data transmitted from the specifically-designed application program of the PC 1 to the USB-storage media 2.

The control data includes a 4-byte-current-password-hash section, a 4-byte-new-password-hash section, and a 16-byte-registration-encryption-key section that are arranged in that order from the head of the control data.

In each of the current-password-hash section and the new-password-hash section, a password hash generated by the hash-value-calculation unit 42 shown in FIG. 3 is arranged. The encryption key generated by the encryption-key-generation unit 41 is arranged in the registration-encryption-key section.

Next, processing procedures performed by the PC 1 shown in FIG. 3 and the USB-storage media 2 shown in FIG. 4 will be described with reference to flowcharts shown in FIGS. 8, 9, 10, 11, and 12.

For example, the user instructs the specifically-designed application program to perform initialization processing by operating the input unit 16 shown in FIG. 2. It should be noted that the initialization processing is performed to register the internal-password hash and the encryption key with the special area 81 at the first. After the above-described instruction is issued, the PC 1 and the USB-storage media 2 perform the initialization processing.

Figure 8:
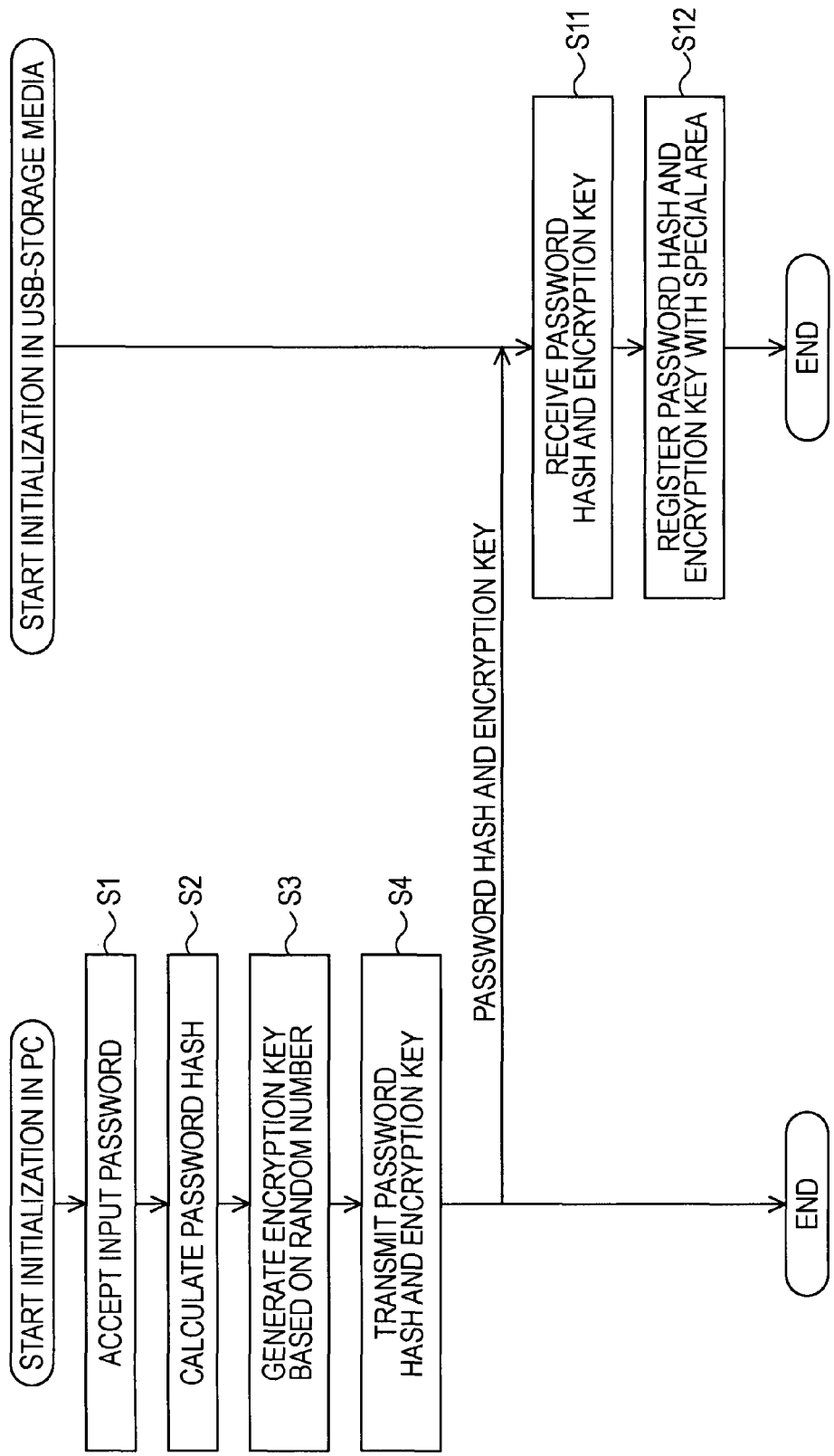
FIG. 8 is a flowchart illustrating initialization processing performed by the PC and the USB-storage media.

That is to say, the flowchart shown in FIG. 8 illustrates the initialization processing performed by each of the PC 1 and the USB-storage media 2.

The left part of the flowchart of FIG. 8 shows the initialization processing performed by the PC 1 and the right part thereof shows the initialization processing performed by the USB-storage media 2.

First, the initialization processing performed by the PC 1 will be described with reference to the left part of FIG. 8.

After the USB-storage media 2 is attached to the PC 1, the user operates the input unit 16 so that the initialization processing is performed. Then, the specifically-designed application program displays a message encouraging the user to input a password on the output unit 17 shown in FIG. 2.

At that time, the internal-password hash is not yet registered with the USB-storage media 2.

When the user inputs the password by operating the input unit 16 according to the message, the specifically-designed application program accepts the input password, at step S1, and proceeds to step S2.

Further, information input by the user, as the password, includes a number, a character, a symbol, and so forth, and information by which the hash-value-calculation unit 42 shown in FIG. 3 can calculate a hash value. The information by which the hash value can be calculated includes fingerprint data read by a fingerprint reader, data stored in a file specified by the user, and so forth.

At step S2, the hash-value-calculation unit 42 calculates a password hash which is the hash value of the password accepted, at step S1, transmits the password hash to the communication-control unit 43, and proceeds to step S3.

At step S3, the encryption-key-generation unit 41 generates a random number and generates an encryption key based on the generated random number. Then, the encryption-key-generation unit 41 transmits the generated encryption key to the communication-control unit 43 and proceeds to step S4.

At step S4, the communication-control unit 43 generates control data by arranging the password hash transmitted from the hash-value-calculation unit 42 in the new-password-hash section of the control data shown in FIG. 7, and the encryption key transmitted from the encryption-key-generation unit 41 in the registration-encryption-key section. Further, the communication-control unit 43 transmits the generated control data to the USB-storage media 2, whereby the initialization processing performed by the PC 1 is finished. It should be noted that dummy data is arranged in the current-password-hash section of the control data, at step S4.

Next, initialization processing performed by the USB-storage media 2 will be described with reference to the right part of FIG. 8.

When the control data is transmitted from the PC 1, the CPU 72 of the USB-storage media 2 shown in FIG. 4 receives the control data via the USB-I/F 71, at step S11.

At that time, no internal-password hash is stored in the special area 81 of the flash memory 2, as described above. In that case, the CPU 72 ignores the current-password-hash section of the control data transmitted from the PC 1, transmits the password hash of the new-password-hash section and the encryption key of the registration-encryption-key section to the flash-memory controller 75, and proceeds to step S12.

At step S12, the flash-memory controller 75 stores the password hash transmitted from the CPU 72 in the special area 81 of the flash memory 62, as the internal-password hash, and stores the encryption key transmitted from the CPU 72 in the special area 81, whereby the initialization processing performed by the USB-storage media 2 is finished.

After the internal-password hash and the encryption key are stored in the special area 81 in the above-described manner, the user operates the input unit 16, so as to change the internal-password hash. Then, each of the PC 1 and the USB-storage media 2 performs password-change processing, so as to change the internal-password hash registered with the special area 81.

The password-change processing performed by each of the PC 1 and the USB-storage media 2 will be described with reference to the flowchart shown in FIG. 9.

Figure 9:
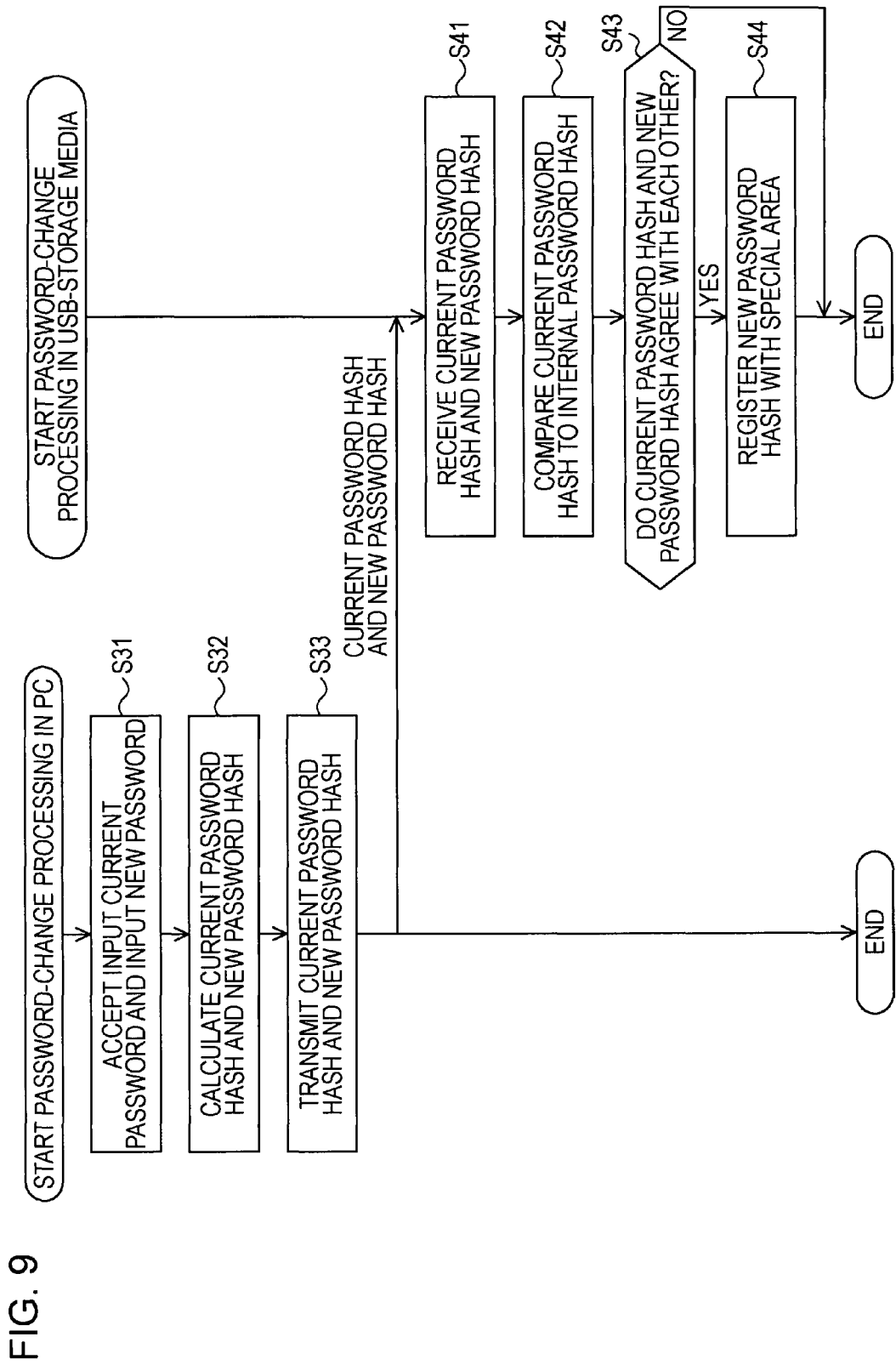
FIG. 9 is a flowchart illustrating password-change processing performed by the PC and the USB-storage media.

The left part of the flowchart shown in FIG. 9 illustrates the password-change processing performed by the PC 1, and the right part thereof illustrates the password-change processing performed by the USB-storage media 2.

First, the password-change processing performed by the PC 1 will be described with reference to the left part of FIG. 9.

After the USB-storage media 2 is inserted into the PC 1, the user operates the input unit 16 so that the password-change processing is performed. Then, the specifically-designed application program displays a message on the output unit 17 shown in FIG. 2, so as to encourage the user to input a current password which is a password that is not yet changed and a new password which is a changed password.

When the user inputs the current password and the new password by operating the input unit 16 according to the message, the specifically-designed application program accepts the above-described input current password and new password, at step S31, and proceeds to step S32.

At step S32, the hash-value-calculation unit 42 shown in FIG. 3 calculates each of a current password hash which is the hash value of the current password accepted, at step S31, and a new password hash which is the hash value of the new password accepted, at step S31, transmits the calculated current password hash and new password hash to the communication-control unit 43, and proceeds to step S33.

At step S33, the communication-control unit 43 generates control data by arranging the current password hash transmitted from the hash-value-calculation unit 42 in the current-password-hash section of the control data shown in FIG. 7, and the new password hash transmitted from the hash-value-calculation unit 42 in the new-password-hash section. Further, the communication-control unit 43 transmits the generated control data to the USB-storage media 2, whereby the password-change processing performed by the PC 1 is finished. It should be noted that dummy data is arranged in the registration-encryption-key section of the control data, at step S33.

Next, password-change processing performed by the USB-storage media 2 will be described with reference to the right part of FIG. 9.

When the control data is transmitted from the PC 1, the CPU 72 of the USB-storage media 2 shown in FIG. 4 receives the control data via the USB-I/F 71, at step S41, and proceeds to step S42.

At step S42, the CPU 72 acquires or reads the internal-password hash stored in the special area 81 of the flash memory 62 via the flash-memory controller 75. Then, the CPU 72 compares the read internal-password hash to the password hash arranged in the current-password-hash section of the control data received, at step S41, and proceeds to step S43.

At step S43, the CPU 72 determines whether or not the internal-password hash agrees, with the password hash arranged in the current-password-hash section. If it is determined that the internal-password hash does not agree with the password hash arranged in the current-password-hash section, at step S43, namely, when the validity of the user is not confirmed, the password-change processing performed by the USB-storage media 2 is finished.

In that case, the CPU 72 transmits an error message to the PC 1, for example. In the PC 1, the error message transmitted from the CPU 72 is displayed on the output unit 17 shown in FIG. 2.

On the other hand, if it is determined that the internal-password hash agrees with the password hash arranged in the current-password-hash section, namely, when the validity of the user is confirmed, at step S43, the CPU 72 confirms that information arranged in the new-password-hash section of the control data is the password hash of a new password, where the password hash is neither change-instruction information nor key-request information that will be described later. Then, the CPU 72 transmits the above-described password hash to the flash-memory controller 75 and proceeds to step S44.

Namely, when the encryption key stored in the special area 81 of the USB-storage media 2 is to be changed, the specifically-designed application program generates control data having the new-password-hash section where the change-instruction information that will be described later is arranged. Further, when encoded data is written and/or read into and/or from the USB-storage media 2, the specifically-designed application generates control data having the new-password-hash section where the key-request information that will be described later is arranged.

When information which is neither the change-instruction information nor the key-request information is arranged in the new-password-hash section of the control data, the CPU 72 identifies the information as the password hash of the new password and transmits the password hash to the flash-memory controller 75.

At step S44, the flash-memory controller 75 writes the password hash transmitted from the CPU 72 over the internal-password hash stored in the special area 81, whereby the password-change processing performed by the USB-storage media 2 is finished.

Subsequently, the internal-password hash stored in the USB-storage media 2 is changed.

Next, the encryption key stored in the special area 81 of the USB-storage media 2 can be changed according to an instruction issued by the user.

Therefore, encryption-key-change processing performed by each of the PC 1 and the USB-storage media 2, so as to change the encryption key, will be described with reference to the flowchart shown in FIG. 10.

Figure 10:
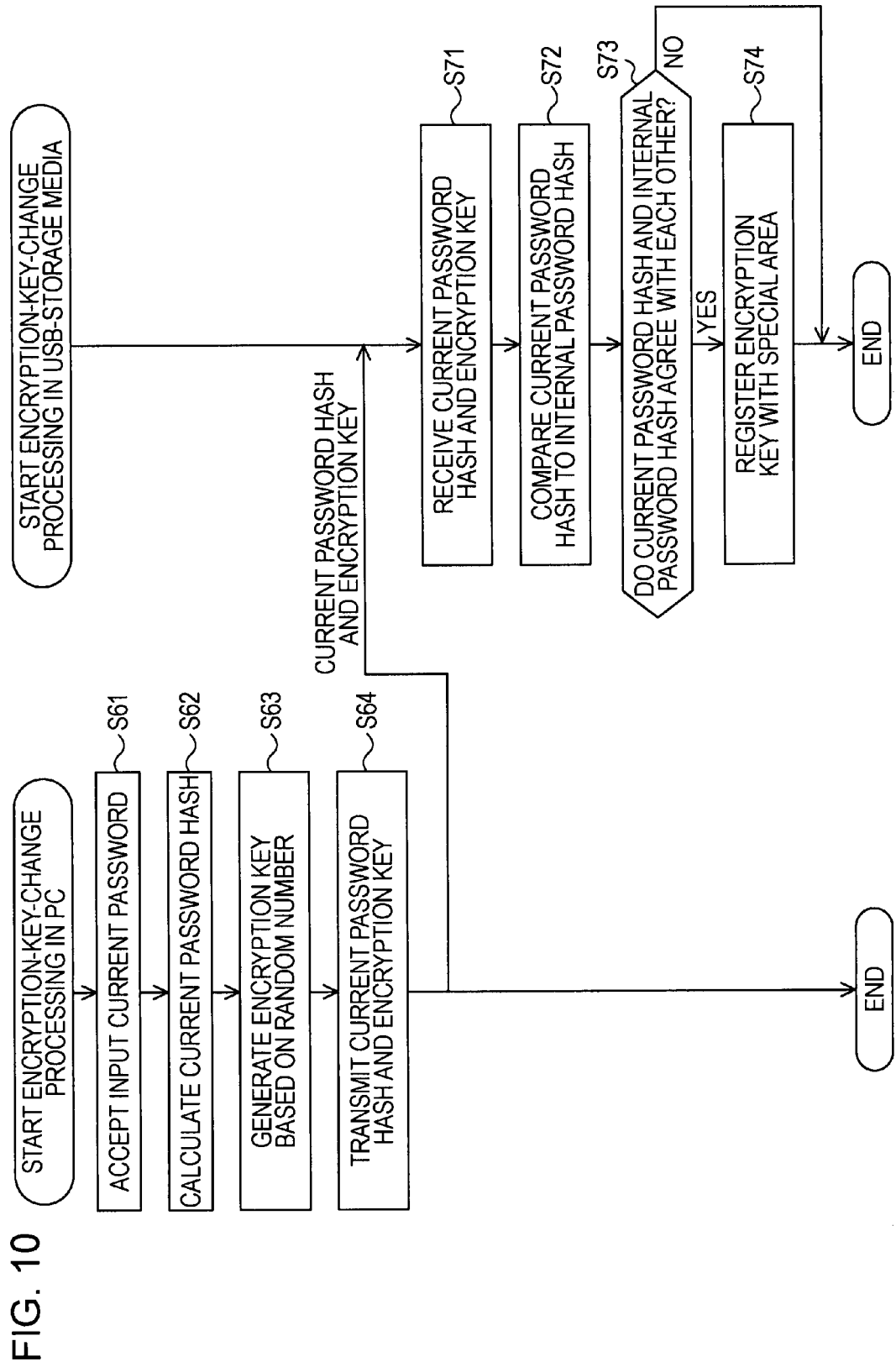
FIG. 10 is a flowchart illustrating encryption-key-change processing performed by the PC and the USB-storage media.

The left part of the flowchart of FIG. 10 shows the encryption-key-change processing performed by the PC 1 and the right part thereof shows the encryption-key-change processing performed by the USB-storage media 2.

First, the encryption-key-change processing performed by the PC 1 will be described with reference to the left part of FIG. 10.

After the USB-storage media 2 is inserted into the PC 1, the user operates the input unit 16, so as to change the encryption key. Then, the specifically-designed application program displays a message encouraging the user to input the current password which is a currently used password on the output unit 17.

When the user inputs the current password by operating the input unit 16 according to the message, the specifically-designed application program accepts the current password input by the user, at step S61, and proceeds to step S62.

At step S62, the hash-value-calculation unit 42 calculates a current password hash which is the hash value of the current password accepted, at step S61, transmits the current password hash to the communication-control unit 43, and proceeds to step S63.

At step S63, the encryption-key-generation unit 41 generates a random number and generates a new encryption key based on the generated random number. Then, the encryption-key-generation unit 41 transmits the generated new encryption key to the communication-control unit 43 and proceeds to step S64.

At step S64, the communication-control unit 43 generates control data by arranging the current password hash transmitted from the hash-value-calculation unit 42 in the current-password-hash section of the control data shown in FIG. 7, and arranging the new encryption key transmitted from the encryption-key-generation unit 41 in the registration-encryption-key section. Further, the communication-control unit 43 transmits the generated control data to the USB-storage media 2, whereby the encryption-key-change processing performed by the PC 1 is finished. Further, at step S64, one of $00_{(16)}$ and $FF_{(16)}$ that are base-sixteen numbers is arranged in the new-password-hash section of the new-password-hash section of the control data, as change-instruction information provided to instruct the PC 1 to perform the encryption-key-change processing.

Next, the encryption-key-change processing performed by the USB-storage media 2 will be described with reference to the right part of FIG. 10.

When the control data is transmitted from the PC 1, the CPU 72 of the USB-storage media 2 shown in FIG. 4 receives the control data via the USB-I/F 71, at step S71, and proceeds to step S72.

At step S72, the CPU 72 acquires or reads the internal-password hash stored in the special area 81 of the flash memory 62 via the flash-memory controller 75. Then, the CPU 72 compares the read internal-password hash to the password hash arranged in the current-password-hash section of the control data received, at step S71, and proceeds to step S73.

At step S73, the CPU 72 determines whether or not the internal-password hash agrees with the password hash arranged in the current-password-hash section. If it is determined that the internal-password hash does not agree with the password hash arranged in the current-password-hash section, at step S73, namely, when the validity of the user is not confirmed, the encryption-key-change processing performed by the USB-storage media 2 is finished.

In that case, the CPU 72 transmits an error message to the PC 1, for example. In the PC 1, the error message transmitted from the CPU 72 is displayed on the output unit 17 shown in FIG. 2.

On the other hand, if it is determined that the internal-password hash agrees with the password hash arranged in the current-password-hash section, namely, when the validity of the user is confirmed, at step S73, the CPU 72 transmits the new encryption key of the registration-encryption-key section of the control data to the flash-memory controller 75 and proceeds to step S74.

Namely, in that case, $00_{(16)}$ and/or $FF_{(16)}$ is arranged in the new-password-hash section of the control data transmitted from the PC 1, as the change-instruction information. When the change-instruction information is arranged in the new-password-hash section of the control data, the CPU 72 transmits the new encryption key of the registration-encryption-key section of the control data to the flash-memory controller 75, so as to change the encryption key stored in the special area 81.

At step S74, the flash-memory controller 75 writes the new encryption key transmitted from the CPU 72 over the encryption key stored in the special area 81, whereby the encryption-key-change processing performed by the USB-storage media 2 is finished.

Subsequently, the encryption key stored in the USB-storage media 2 is changed.

Next, data-write processing performed by each of the PC 1 and the USB-storage media 2 will be described with reference to the flowchart of FIG. 11, the data-write processing being performed to write encoded data into the secure area 82.

Figure 11:
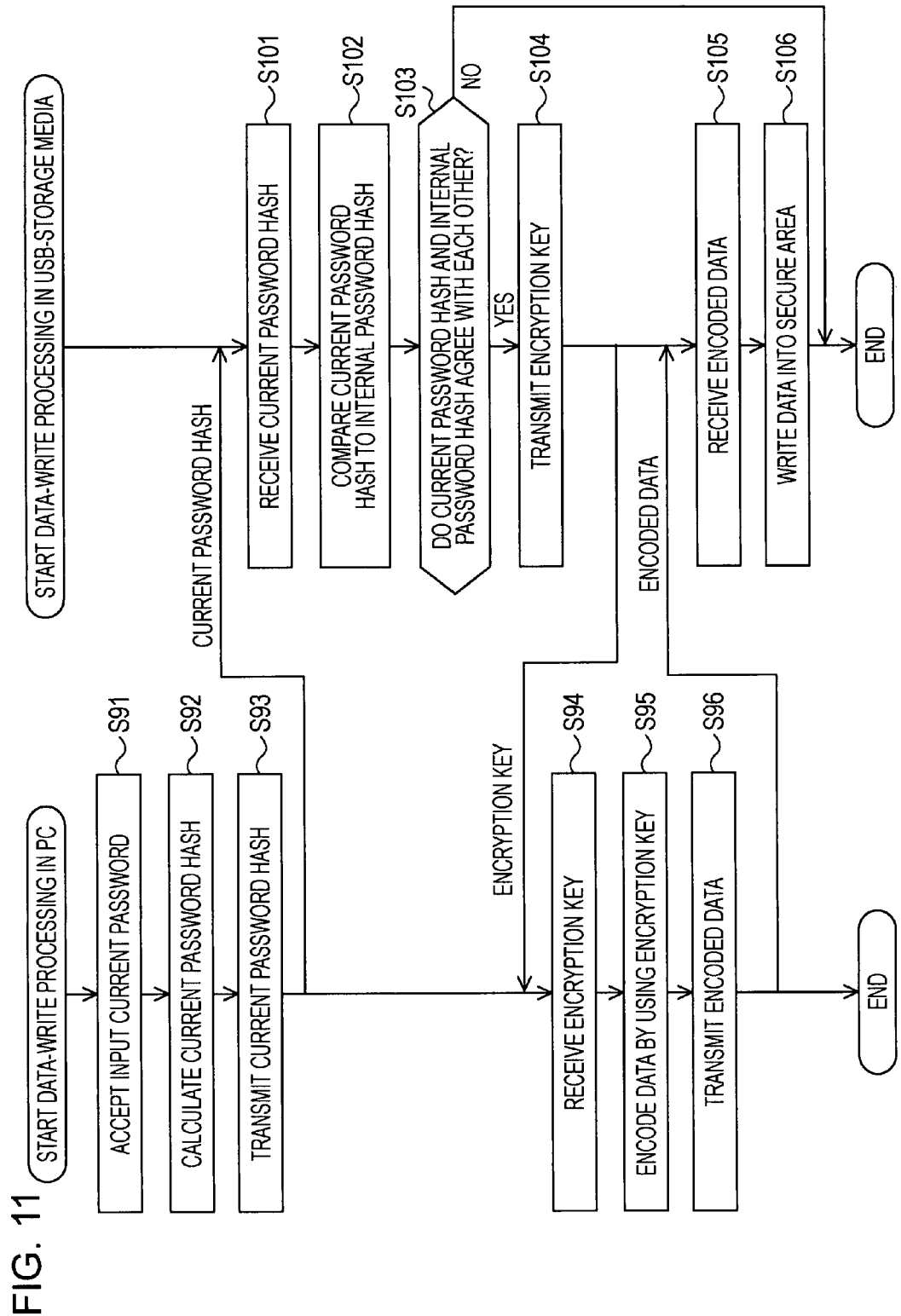
FIG. 11 is a flowchart illustrating data-write processing performed by the PC and the USB-storage media.

The left part of the flowchart of FIG. 11 illustrates the data-write processing performed by the PC 1 and the right part thereof illustrates the data-write processing performed by the USB-storage media 2.

First, the data-write processing performed by the PC 1 will be described with reference to the left part of FIG. 11.

The data-write processing is started in the following manner, for example. Namely, after the USB-storage media 2 is attached to the PC 1, the user instructs the PC 1 to write data into the secure area 82 by operating the input unit 16, whereby the data-write processing is started.

That is to say, when the user instructs the PC 1 to write the data into the secure area 82 by operating the input unit 16, the specifically-designed application program displays a message encouraging the user to input a password on the output unit 17.

When the user inputs the current password which is currently used by operating the input unit 16 according to the message, the specifically-designed application program accepts the current password input by the user, at step S91, and proceeds to step S92.

At step S92, the hash-value-calculation unit 42 calculates a current password hash which is the hash value of the current password accepted, at step S91, transmits the current password hash to the communication-control unit 43, and proceeds to step S93.

At step S93, the communication-control unit 43 generates control data by arranging the current password hash transmitted from the hash-value-calculation unit 42 in the current-password-hash section of the control data shown in FIG. 7, and the same password hash as the current-password hash in the new-password-hash section, and transmits the control data to the USB-storage media 2, for example. Then, the communication-control unit 43 waits until the encryption key is transmitted from the USB-storage media 2, as described later, and proceeds to step S94.

At step S94, the communication-control unit 43 of the PC 1 receives the encryption key transmitted from the USB-storage media 2, transmits the encryption key to the encode-processing unit 44, and proceeds to step S95.

At step S95, the encode unit 44A of the encode-processing unit 44 encodes data that is specified by the user so that the data is written by using the encryption key transmitted from the communication-control unit 43, at step S94, transmits the encoded data to the communication-control unit 43, and proceeds to step S96.

At step S96, the communication-control unit 43 transmits the data encoded, at step S95, to the USB-storage media 2 so that the data-write processing performed by the PC 1 is finished.

Next, the data-write processing performed by the USB-storage media 2 will be described with reference to the right part of FIG. 11.

When the control data is transmitted from the PC 1, the CPU 72 of the USB-storage media 2 shown in FIG. 4 receives the control data via the USB-I/F 71, at step S101, and proceeds to step S102.

At step S102, the CPU 72 acquires, or reads the internal-password hash stored in the special area 81 of the flash memory 62 via the flash-memory controller 75. Then, the CPU 72 compares the read internal-password hash to the password hash arranged in the current-password-hash section of the control data received, at step S101, and proceeds to step S103.

At step S103, the CPU 72 determines whether or not the internal-password hash agrees with the password hash arranged in the current-password-hash section. If it is determined that the internal-password hash does not agree with the password hash arranged in the current-password-hash section, namely, when the validity of the user is not confirmed, at step S103, the data-write processing performed by the USB-storage media 2 is finished.

In that case, the CPU 72 transmits an error message to the PC 1, for example. In the PC 1, the error message transmitted from the CPU 72 is displayed on the output unit 17 shown in FIG. 2.

On the other hand, if it is determined that the internal-password hash agrees with the password hash arranged in the current-password-hash section, namely, when the validity of the user is confirmed, at step S103, the CPU 72 proceeds to step S104 so that when information included in the new-password-hash section of the control data received, at step S101, is the same as the password hash arranged in the current-password-hash section, the CPU 72 acquires or reads the encryption key stored in the special area 81 of the flash memory 62 via the flash-memory controller 75.

Namely, when the specifically-designed-application program of the PC 1 requests the encryption key from the USB-storage media 2, the specifically-designed-application program generates control data by arranging the same information as the password hash of the current-password section in the new-password section, as described in the left part of the flowchart shown in FIG. 11. When the specifically-designed-application program requests the encryption key, and the same information as the password hash of the current-password-hash section, the same information being arranged in the new-password-hash section of the control data, is determined to be the key-request information, the CPU 72 reads the encryption key from the special area 81 of the flash memory 62 when the key-request information which is the same information as the password hash of the current-password section is arranged in the new-password section of the control data.

Further, the CPU 72 transmits the encryption key read from the special area 81 to the PC 1 via the USB-I/F 71, waits until data encoded by the PC 1 by using the transmitted encryption key is transmitted from the PC 1, and proceeds to step S105.

At step S105, the CPU 72 receives the encoded data transmitted from the PC 1 and proceeds to step S106.

At step S106, the CPU 72 writes the encoded data transmitted from the PC 1 into the secure area 82 of the flash memory 62 via the flash-memory controller 75, whereby the data-write processing performed by the USB-storage media 2 is finished.

Subsequently, the data encoded by the PC 1 by using the encryption key stored in the special area 81 is stored in the secure area 82 of the USB-storage media 2.

Next, the data-read processing performed by each of the PC 1 and the USB-storage media 2 will be described with reference to the flowchart of FIG. 12, the data-read-processing being performed to read the encoded data from the secure area 82.

Figure 12:
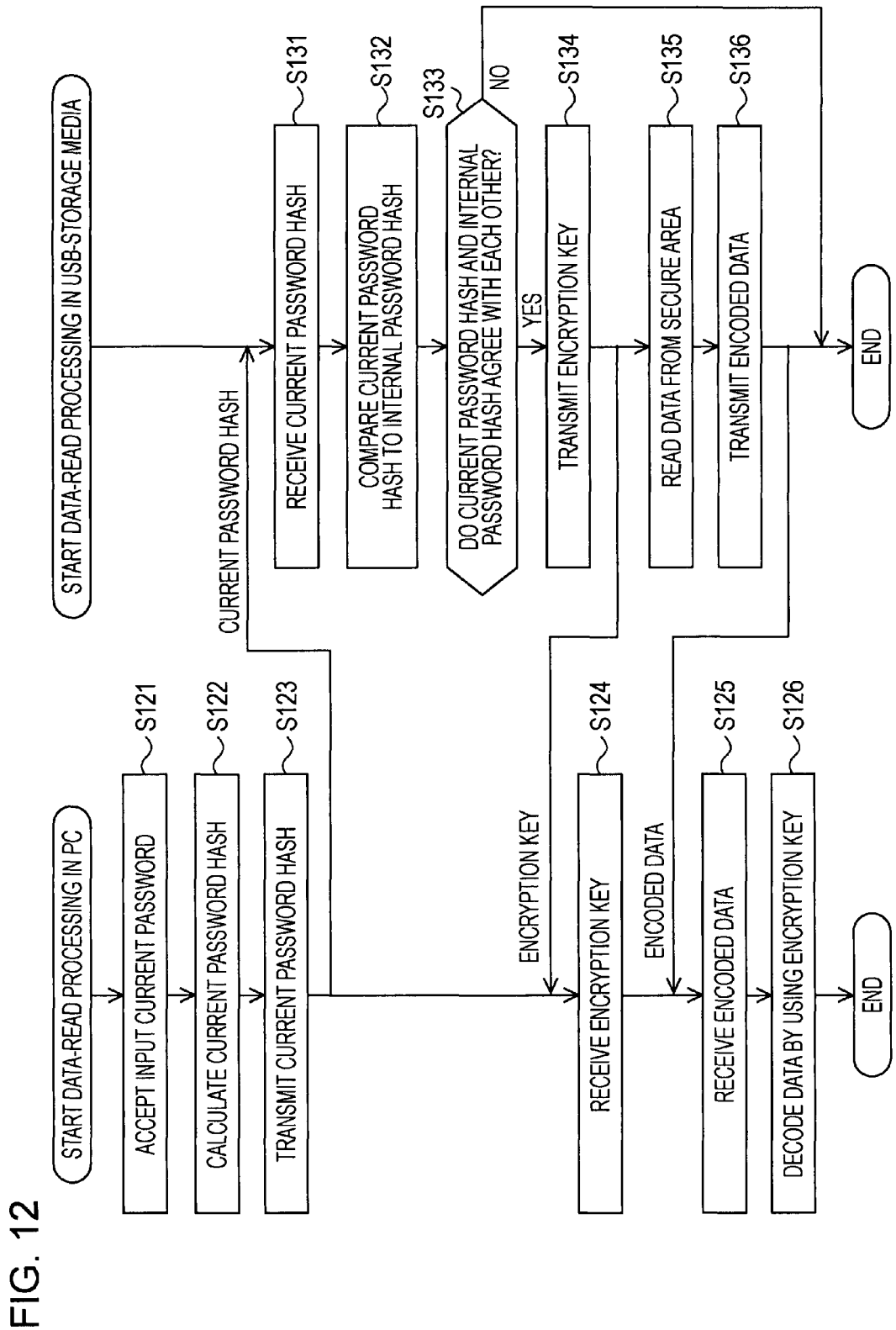
FIG. 12 is a flowchart illustrating data-read processing performed by the PC and the USB-storage media.

The left part of the flowchart of FIG. 12 illustrates the data-read processing performed by the PC 1 and the right part thereof illustrates the data-read processing performed by the USB-storage media 2.

First, the data-read processing performed by the PC 1 will be described with reference to the left part of FIG. 12.

The data-read processing is started in the following manner, for example. Namely, after the USB-storage media 2 is attached to the PC 1, the user instructs the PC 1 to read data from the secure area 82 by operating the input unit 16, whereby the data-read processing is started.

That is to say, when the user instructs the PC 1 to read the data from the secure area 82 by operating the input unit 16, the specifically-designed application program displays a message encouraging the user to input a password on the output unit 17.

When the user inputs the current password which is currently used by operating the input unit 16 according to the message, the specifically-designed application program accepts the current password input by the user, at step S121, and proceeds to step S122.

At step S122, the hash-value-calculation unit 42 calculates a current password hash which is the hash value of the current password accepted, at step S121, transmits the current password hash to the communication-control unit 43, and proceeds to step S123.

At step S123, the communication-control unit 43 generates control data by arranging the current password hash transmitted from the hash-value-calculation unit 42 in the current-password-hash section of the control data shown in FIG. 7, and the same password hash as the current-password hash in the new-password-hash section, namely, the key-request information, for example, and transmits the control data to the USB-storage media 2. Then, the communication-control unit 43 waits until the encryption key is transmitted from the USB-storage media 2, as described later, and proceeds to step S124.

At step S124, the communication-control unit 43 of the PC 1 receives the encryption key transmitted from the USB-storage media 2, and transmits the encryption key to the encode-processing unit 44. Then, the communication-control unit 43 waits until the encoded data specified by the user so that the encoded data is read is transmitted from the USB-storage media 2, and proceeds to step S125.

At step S125, the communication-control unit 43 receives the encoded data transmitted from the USB-storage media 2, transmits the received encoded data to the encode-processing unit 44, and proceeds to step S126.

At step S126, the decode unit 44B of the encode-processing unit 44 decodes the encoded data transmitted from the communication-control unit 43, at step S125, by using the encryption key transmitted from the communication-control unit 43, at step S124, whereby the data-read processing performed by the PC 1 is finished.

Subsequently, the encoded data is read from the secure area 82 of the USB-storage media 2, and the encoded data is decoded by using the encryption key stored in the special area 81.

Next, the data-read processing performed by the USB-storage media 2 will be described with reference to the right part of FIG. 12.

When the control data is transmitted from the PC 1, the CPU 72 of the USB-storage media 2 shown in FIG. 4 receives the control data via the USB-I/F 71, at step S131, and proceeds to step S132.

At step S132, the CPU 72 acquires or reads the internal-password hash stored in the special area 81 of the flash memory 62 via the flash-memory controller 75. Then, the CPU 72 compares the read internal-password hash to the password hash arranged in the current-password-hash section of the control data received, at step S131, and proceeds to step S133.

At step S133, the CPU 72 determines whether or not the internal-password hash agrees with the password hash arranged in the current-password-hash section. If it is determined that the internal-password hash does not agree with the password hash arranged in the current-password-hash section, namely, when the validity of the user is hot confirmed, at step S133, the data-read processing performed by the USB-storage media 2 is finished.

In that case, the CPU 72 transmits an error message to the PC 1, for example. In the PC 1, the error message transmitted from the CPU 72 is displayed on the output unit 17 shown in FIG. 2.

On the other hand, if it is determined that the internal-password hash agrees with the password hash arranged in the current-password-hash section, namely, when the validity of the user is confirmed, at step S133, the processing advances to step S134 where the CPU 72 confirms that the information included in the new-password-hash section of the control data received, at step S131, is the same as the password hash of the current-password-hash section, that is, the key-request information, and acquires or reads the encryption key stored in the special area 81 of the flash memory 62 via the flash-memory controller 75.

Further, the CPU 72 transmits the encryption key read from the special area 81 to the PC 1 via the USB-I/F 71, and proceeds to step S135.

At step S135, the CPU 72 reads the encoded data specified by the user so that the encoded data is read from the secure area 82 of the flash memory 62 via the flash memory 55, and proceeds to step S136.

At step S136, the CPU 72 transmits the encoded data read from the secure area 82, at step S135, to the PC 1 via the USB-I/F 71 and finishes the data-read processing performed by the USB-storage media 2.

As described above, the USB-storage media 2 has the flash memory 62 including at least the special area 81 storing the encryption key and the password hash which is the internal-password hash that are generated by the PC 1 and the secure area 82 storing the data encoded by the PC 1 by using the encryption key. The user is authenticated based on the password hash generated by the PC 1 based on information input by the user and the password hash which is the internal-password hash stored in the special area 81. When the validity of the user is confirmed through the authentication, the encryption key stored in the special area 81 is transmitted from the USB-storage media 2 to the PC 1. Therefore, the encoded data stored in the secure area 82 is not decoded until the user validity is confirmed, which reduces the leakage of information stored in the secure area 82.

Further, since data encoding and data decoding, which entail a high-cost calculation, are not performed in the USB-storage media 2, the USB-storage media 2 has a price which is almost the same as that of ordinary USB-storage media with no security measures.

Still further, the USB-storage media 2 is configured, as a self-contained device storing the password hash corresponding to a password used to retain security. Therefore, if the USB-storage media 2 is attached to a PC where a specifically-designed application program runs, the above-described initialization processing, password-change processing, encryption-key-change processing, data-write processing, and data-read processing can be performed.

Next, processing performed by each of the PC 1 and the USB-storage media 2, so as to write and/or read file data into and/or from the USB-storage media 2 by using a graphical-user interface (GUI), will be described. Here, the USB-storage media 2 is identified by the PC 1, as a drive or a storage device.

In the PC 1, the USB-storage media 2 is identified as the drive, and file data can be written and/or read, as is the case with an ordinary drive including a hard-disk drive (HDD) or the like.

Figure 13:
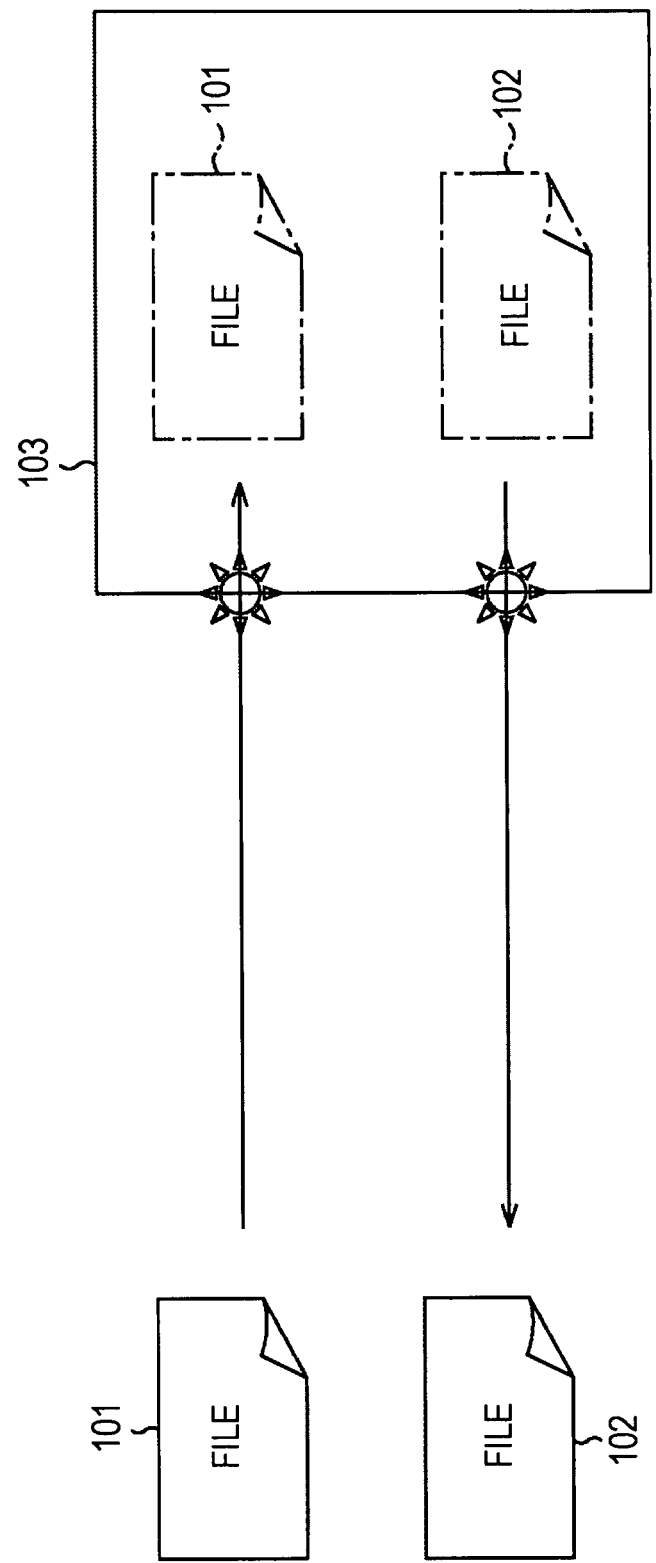
FIG. 13 shows a drive window indicating details on data stored in the secure area of the USB-storage media.

Namely, FIG. 13 shows a drive window 103 functioning, as a GUI showing details on data stored in the secure area 82 of the USB-storage media 2 identified as the drive in the PC 1.

The user drags an icon indicating file data 101 provided outside the drive window 103, moves the file data 101 into the drive window 103, and releases the drag, which means that the file data 101 is dropped into the drive window 103. Thus, the data file 101 can be moved from outside the drive window 103 into the drive window 103.

Further, the user drags file data 102 shown in the drive window 103, moves the file data 102 out of the drive window 103, and releases the drag so that the file data 102 is moved from within the drive window 103 out of the drive window 103.

Namely, when the file data 101 is moved from outside the drive window 103 into the drive window 103, the OS of the PC 1 detects that the file data 101 is moved into the drive window 103 and a specifically-designed application program is notified of the detection. The specifically-designed application program identifies the above-described detection notification as an instruction to write data into the USB-storage media 2, and encodes the file data 101 by using the encryption key according to the above-described data-write processing performed by the PC 1 and the USB-storage media 2. Further, the OS of the PC 1 writes the encoded file data 101 into the secure area 82. Then, after the encoded file data 101 is written into the secure area 82, the specifically-designed application program deletes the file data 101 that is not yet encoded via the OS.

On the other hand, when the file data 102 is moved from within the drive window 103 out of the drive window 103, the OS of the PC 1 detects that the file data 102 is moved out of the drive window 103 and the specifically-designed application program is notified of the above-described detection. Further, the OS of the PC 1 reads the encoded file data 102 from the secure area 82. The specifically-designed application program identifies the detection notification as an instruction to read data from the USB-storage media 2, and decodes the encoded file data 101 read by the OS by using the encryption key according to the above-described data-read processing performed by the PC 1 and the USB-storage media 2. After the file data 102 is decoded, the specifically-designed application program deletes the encoded file data 102 stored in the secure area 82 of the USB-storage media 2 and the encoded file data 102 read from the USB-storage media 2 by the PC 1 via the OS.

According to the data-write processing shown in FIG. 11 and the data-read processing shown in FIG. 12, the user inputs the password each time data is written and/or read into and/or from the USB-storage media 2. However, once the validity of the user is confirmed through the user authentication performed during the data-write processing and/or the data-read processing, the user may not input the password as long as it is considered that the user validity is confirmed. In that case, the user may not be aware of data encoding and/or data decoding performed by the PC 1. Namely, the user can write and/or read file data into and/or from the USB-storage media 2 identified as the drive by the PC 1 by using the GUI, as is the case where the file data is written and/or read according to an ordinary method so that the file data is neither encoded nor decoded.

If the user may not input the password over the time period where it is considered that the user validity is confirmed, the data-write processing shown in FIG. 11 and/or the data-read processing shown in FIG. 12 is performed at first. Then, the processing corresponding to steps S95 and S96, and steps S105 and S106 that are shown in FIG. 11 is performed, as the data-write processing. Further, the processing corresponding to steps S125 and S126, and steps S135 and S136 that are shown in FIG. 12 is performed, as the data-read processing.

Further, when the USB-storage media 2 is removed from the PC 1, for example, so that it is considered that the user validity is not confirmed, the specifically-designed application program of the PC 1 internally deletes the encryption key transmitted from the USB-storage media 2.

The details on the data-encoding method will not be described in this specification. However, it should be noted that a higher level of security can be obtained by transmitting and/or receiving data between the PC 1 and the USB-storage media 2 through encryption communications.

Further, in this specification, steps describing a program stored in a program-recording medium include not only processing executed in time sequence according to the written order but also processing that is not necessarily executed in time sequence but can be executed in parallel and/or separately.

An embodiment of the present invention can be applied not only for the USB-storage media but also for a storage device or a drive using a recording medium including a magnetic disk, a magnetic tape, a DVD, and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. A storage device that can be attached and/or detached to and/or from an information-processing device, the storage device comprising:
storage means including a first area provided to store an encryption key used to encode first information and first authentication information used to perform authentication, and a second area provided to store second information encoded by the information-processing device by using the encryption key;
authentication means configured to authenticate a user based on second authentication information generated by the information-processing device based on third information input by the user and the first authentication information stored in the first area;
transmission means configured to transmit the encryption key stored in the first area to the information-processing device when validity of the user is confirmed through the authentication; and
control means configured to have control over writing and/or reading the encoded second information into and/or from the second area, and further wherein the storage device has a common bus which transfers data to and from a flash memory controller that controls a flash memory portioned into a plurality of regions including a first region where access can be made only from at least one selected application program and at least one second region where access can be made only from an operating system and at least one third region that is accessible via the common bus without restriction.

2. The storage device according to claim 1, wherein the second authentication information is a hash value generated by the information-processing device based on the third information input by the user.

3. The storage device according to claim 1, wherein the storage means further includes a third area provided to store fourth information which is not encoded by using the encryption key.

4. The storage device according to claim 1, wherein only a predetermined application program running on an operating system installed in the information-processing device can write and/or read the encryption key and/or the first authentication information into and/or from the first area, and
wherein the encoded second information can be written and/or read into and/or from the second area according to a command issued by the OS.

5. A storage method used for a storage device that can be attached and/or detached to and/or from an information-processing device, the storage device having storage means including a first area provided to store an encryption key used to encode first information and first authentication information used to perform authentication, and a second area provided to store second information encoded by the information-processing device by using the encryption key, the storage method comprising the steps of:
authenticating a user based on second authentication information generated by the information-processing device based on third information input by the user and the first authentication information stored in the first area;
transmitting the encryption key stored in the first area to the information-processing device when validity of the user is confirmed through the user authentication; and
having control over writing and/or reading the encoded second information into and/or from the second area, and further wherein the storage device has a common bus which transfers data to and from a flash memory controller that controls a flash memory portioned into a plurality of regions including a first region where access can be made only from at least one selected application program and at least one second region where access can be made only from an operating system and at least one third region that is accessible via the common bus without restriction.

6. An information-processing device to which a detachable storage device is attached, the information-processing device comprising:
authentication-information-generation means configured to generate first authentication information used to perform authentication based on first information input by a user; and
encode-processing means configured to encode second information stored in the storage device and/or decode the encoded second information transmitted from the storage device by using an encryption key used to perform information encoding, the encryption key being transmitted from the storage device, when validity of the user is confirmed during the authentication performed by the storage device for the user based on the first authentication information and second authentication information stored in the storage device, and further wherein the storage device has a common bus which transfers data to and from a flash memory controller that controls a flash memory portioned into a plurality of regions including a first region where access can be made only from at least one selected application program and at least one second region where access can be made only from an operating system and at least one third region that is accessible via the common bus without restriction.

7. An information-processing method used for an information-processing device to which a detachable storage device is attached, the information-processing method comprising the steps of:

generating first authentication information used to perform authentication based on first information input by a user; and encoding second information stored in the storage device and/or decoding the encoded second information transmitted from the storage device by using an encryption key used to perform information encoding, the encryption key being transmitted from the storage device, when validity of the user is confirmed during the authentication performed by the storage device for the user based on the first authentication information and second authentication information stored in the storage device, and further wherein the storage device has a common bus which transfers data to and from a flash memory controller that controls a flash memory portioned into a plurality of regions including a first region where access can be made only from at least one selected application program and at least one second region where access can be made only from an operating system and at least one third region that is accessible via the common bus without restriction.

8. A storage device that can be attached and/or detached to and/or from an information-processing device, the storage device comprising:

a storage unit including a first area provided to store an encryption key used to encode first information and first authentication information used to perform authentication, and a second area provided to store second information encoded by the information-processing device by using the encryption key;

an authentication unit configured to authenticate a user based on second authentication information generated by the information-processing device based on third information input by the user and the first authentication information stored in the first area;

a transmission unit configured to transmit the encryption key stored in the first area to the information-processing device when validity of the user is confirmed through the authentication; and a control unit configured to have control over writing and/or reading the encoded second information into and/or from the second area, and further wherein the storage device has a common bus which transfers data to and from a flash memory controller that controls a flash memory portioned into a plurality of regions including a first region where access can be made only from at least one selected application program and at least one second region where access can be made only from an operating system and at least one third region that is accessible via the common bus without restriction.

9. An information-processing device to which a detachable storage device is attached, the information-processing device comprising:

an authentication-information-generation unit configured to generate first authentication information used to perform authentication based on first information input by a user; and an encode-processing unit configured to encode second information stored in the storage device and/or decode the encoded second information transmitted from the storage device by using an encryption key used to perform information encoding, the encryption key being transmitted from the storage device, when validity of the user is confirmed during the authentication performed by the storage device for the user based on the first authentication information and second authentication information stored in the storage device, and further wherein the storage device has a common bus which transfers data to and from a flash memory controller that controls a flash memory portioned into a plurality of regions including a first region where access can be made only from at least one selected application program and at least one second region where access can be made only from an operating system and at least one third region that is accessible via the common bus without restriction.

* * * * *